United States Patent Office 3,392,194
Patented July 9, 1968

3,392,194
ALPHA-ARYLOXYISOBUTYRAMIDE DERIVATIVES AND THE CORRESPONDING ARYLTHIO AND ARYLSULPHONYL COMPOUNDS
Wilson Shaw Waring, Macclesfield, England, assignor to Imperial Chemical Industries Limited, London, England, a corporation of Great Britain
No Drawing. Filed Aug. 28, 1964, Ser. No. 392,945
Claims priority, application Great Britain, Sept. 19, 1963, 36,911/63
4 Claims. (Cl. 260—516)

ABSTRACT OF THE DISCLOSURE

The disclosure relates to pharmaceutical compositions containing, as the active ingredient, alpha-aryloxy-isobutyramide derivatives and the analogous arylthio and arylsulphonyl compounds, and a method of using same to lower the concentration of cholesterol in blood serum. Certain of the active ingredients, e.g., 2-(4-chlorophenoxy)isobutyramidoacetic acid, are disclosed as new per se.

---

This invention relates to new pharmaceutical compositions and more particularly it relates to pharmaceutical compositions which possess valuable therapeutic properties.

It is believed that certain diseases such as coronary artery disease and atherosclerosis in man are associated with an abnormally high concentration of esterified fatty acids and/or cholesterol in the blood serum. We have now found that certain aryl derivatives of aliphatic acid amides reduce the concentration of cholesterol and/or esterified fatty acids in the blood serum, and they may therefore be useful in the treatment or prophylaxis of such diseases as coronary artery disease and atherosclerosis. The said derivatives also possess sedative properties.

According to the inveniton we provide pharmaceutical compositions containing as active ingredient at least one compound of the formula:

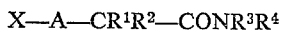

wherein X stands for an aryl radical, optionally substituted, wherein A stands for an oxygen atom, a sulphur atom or the sulphonyl (SO$_2$) radical, wherein either R$^1$ stands for hydrogen and R$^2$ stands for hydrogen or for an alkyl radical, or R$^1$ and R$^2$ both stand for methyl radicals, wherein R$^3$ stands for hydrogen or for an alkyl radical, and wherein R$^4$ stands for hydrogen or for an alkyl, hydroxyalkyl, carboxyalkyl, alkenyl or optionally substituted aryl radical, or an ester or salt thereof, in the presence of a pharmaceutically-acceptable diluent or carrier therefor.

The aryl radical (X) may be a phenyl or naphthyl, radical, optionally substituted by one or more halogen atoms, for example a bromine or chlorine atom, alkyl radicals, for example a methyl radical, alkoxy radicals, for example a methoxy radical, aryl radical, for example a phenyl radical, or aralkyl radicals, for example a benzyl radical. The substituents R$^2$ and R$^3$ may be alkyl radicals, the same or different, each containing up to 6 carbon atoms for example the methyl or ethyl radical. The substituent R$^4$ may be an alkyl radical containing up to 4 carbon atoms, optionally substituted by hydroxy or carboxy radicals, for example the methyl, t-butyl, hydroxyethyl, carboxymethyl, 1-carboxyethyl or 2-carboxyethyl radical, or it may be an alkenyl radical containing up to 6 carbon atoms, for example the allyl radical, or it may be a phenyl radical, optionally substituted by methyl, ethyl, methoxy or ethoxy radicals, for example the 4-ethoxyphenyl radical.

As a preferred active ingredient in the pharmaceutical compositions of this invention there may be mentioned a compound of the formula:

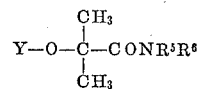

wherein Y stands for a phenyl radical substituted by one or more halogen atoms, for example by a chlorine or bromine atom, and R$^5$ and R$^6$, which may be the same or different, stand for hydrogen or for alkyl radicals, each containing up to 6 carbon atoms, optionally substituted by a carboxy radical, and the esters or salts thereof.

The active ingredients in the pharmaceutical compositions of this invention may be present, where possible, in the form of an ester or salt thereof and as preferred esters and salts there may be mentioned the methyl, ethyl and propyl esters and the alkali metal and alkaline earth metal salts for example the sodium, potassium and calcium salts.

As particularly valuable active ingredients there may be mentioned for example α-(4-chlorophenoxy)isobutyramide, α - (4 - chlorophenoxy)isobutyramidoacetic acid, 2 - [α-(4-chlorophenoxy)isobutyramido]propionic acid, 3 - [α - (4 - chlorophenoxy)isobutyramido]propionic acid and α-(4-bromophenoxy)isobutyramide.

The pharmaceutical compositions may be formulated so as to be suitable for oral administration. For such purposes the active ingredient may be encased within a capsule carrier thereby providing the active ingredient in a unit dosage form for example as capsules containing 0.1 gm., 0.25 gm., 0.5 or 1.0 gm. of active ingredient. The compositions may also be such that the active ingredient is mixed with suitable pharmaceutical excipients and incorporated by known means into such formulations as tablets, capsules, suspensions, emulsions, solutions or dispersible powders.

The active ingredients may be formulated as emulsions, which are prepared with the aid of emulsifying agents, examples of which are sorbitan tri-oleate, polyoxyethylene sorbitan mono-oleate, lecithin, gum acacia and gum tragacanth. The emulsions may contain in addition preservatives, antioxidants, flavouring and sweetening agents and colouring materials.

Active ingredients which are sparingly soluble in water for example α-(4-chlorophenoxy)-isobutyramide may be formulated as suspensions either in an aqueous base or in an emulsion base. Aqueous based suspensions are prepared with the aid of wetting agents for example polyethyleneoxide condensation products of alkyl phenols, fatty alcohols or fatty acids and suspending agents for example hydrophilic colloids such as polyvinylpyrrolidone. Emulsion-based suspensions are prepared by suspending the active ingredient with the aid of wetting agents and suspending agents in the emulsion base which is prepared with the aid of emulsifying agents such as those described above. The suspension formulations may in addition contain sweetening agents, flavouring agents, colouring materials, preservatives and antioxidants.

Syrups or elixirs suitable for oral administration may be prepared from water-soluble salts for example sodium α-(4-chlorophenoxy)isobutyramidoacetate and may advantageously contain glycerol and ethyl alcohol as solvents or preservatives. They may in addition contain sweetening agents and flavouring agents for example essential oils and colouring materials.

Liquid or solid formulations may be filled into capsules for oral administration. Solid formulations suitable for filling into capsules may contain the solid active ingredient in admixture with solid materials which have a buffering action for example colloidal aluminium hydroxide or calcium hydrogen phosphate.

Formulations of the compositions of the invention as tablets which may be coated and either effervescent or non-effervescent may be carried out according to the known art. Diluents or carriers for example magnesium carbonate or lactose are used together with conventional disintegrating agents for example maize starch and alginic acid and lubricating agents for example magnesium stearate.

The compositions of the invention may also additionally contain a steroid derivative such as an androstane derivative for example androsterone or its acetate or propionate.

As indicated above the compositions of the invention are useful in the treatment or prophylaxis of coronary artery disease and atherosclerosis. It is expected that the compositions will generally be administered orally in the form of capsules containing between about 0.1 and 1.0 gm. of liquid or solid active ingredient or in the form of tablets, either effervescent or non-effervescent, containing between about 0.1 and 3.0 gm. of solid active ingredient, these compositions being administered such that a patient undergoing treatment receives a daily dosage of between about 1.0 and 10 gm. of active ingredient.

The active ingredients used in the compositions of the present invention may be prepared from the corresponding acid chloride or ester by reaction with ammonia or with an amine of the formula:

$$NHR^3R^4$$

wherein $R^3$ and $R^4$ have the meanings stated above.

Certain of the compounds used as active ingredients in the compositions of this invention are novel compounds and this forms a subsidiary feature of the invention.

Thus according to a further feature of the invention we provide new butyric acid derivatives of the formula:

$$X-A-\underset{\underset{CH_3}{|}}{\overset{\overset{CH_3}{|}}{C}}-CO-NR^7R^8$$

wherein X and A have the meanings stated above, wherein $R^7$ stands for hydrogen or for an alkyl radical containing not more than 6 carbon atoms and wherein $R^8$ stands for an alkyl radical containing not more than 6 carbon atoms substituted by a carboxy radical, and the esters and salts thereof.

As a preferred group of novel butyric acid derivatives there may be mentioned for example those derivatives of the formula:

$$Y-O-\underset{\underset{CH_3}{|}}{\overset{\overset{CH_3}{|}}{C}}-CONR^7R^8$$

wherein R, $R^7$ and $R^8$ have the meanings stated above and the esters and salts thereof.

The said new butyric acid derivatives may be prepared by interaction of the corresponding acid halide of the formula:

$$X-A-\underset{\underset{CH_3}{|}}{\overset{\overset{CH_3}{|}}{C}}-COZ$$

wherein X and A have the meanings stated above and Z stands for a halogen atom, and an amine of the formula:

$$HNR^7R^8$$

wherein $R^7$ and $R^8$ have the meanings stated above.

The invention is illustrated but not limited by the following examples in which the parts are by weight.

Example 1.—250 parts of α-(4-chlorophenoxy)isobutyramide, 47 parts of maize starch and 3 parts of magnesium stearate are mixed and the mixture is compressed into slugs which are then granulated by passing successively through 6-mesh, 12-mesh and 16-mesh screens. The granules are then compressed into tablets containing 100 mg., 250 mg. or 500 mg. of α-(4-chlorophenoxy)isobutyramide and there are thus obtained tablets suitable for oral administration to man for therapeutic purposes.

The above process is repeated but in place of the α-(4-chlorophenoxy)isobutyramide used as active ingredient in the above formulation, there is used an equal quantity of α - (4 - chlorophenoxy) - N - methylisobutyramide, α-(4-bromophenoxy)isobutyramide or N - methyl - phenoxyacetamide. There are thus likewise obtained tablets suitable for oral administration to man for therapeutic purposes.

The α-(4-chlorophenoxy)isobutyramide used in the above process may be obtained by adding α-(4-chlorophenoxy)isobutyryl chloride gradually to an excess of concentrated aqueous ammonia (density=0.88) with cooling. The mixture is filtered and the solid residue is crystallised from cyclohexane or benzene. There is thus obtained α - (4 - chlorophenoxy)isobutyramide, M.P. 122° C.

Example 2.—A mixture of 500 parts of α-(4-chlorophenoxy)-isobutyramidoacetic acid, 94 parts of maize starch and 3 parts of magnesium stearate is compressed into slugs. The slugs are broken into granules which are then passed through an 8-mesh screen. The granules are then coated with a sufficient quantity of a solution of 15 parts of shellac and 3 parts of castor oil in 800 parts of ethanol. 3 parts of magnesium stearate are then added to the granules and the mixture is compressed to give tablets containing 100 mg., 250 mg. or 500 mg. of α-(4-chlorophenoxy)isobutyramidoacetic acid. The tablets so obtained are suitable for oral administration to man for therapeutic purposes.

The above process is repeated but in place of the α - (4 - chlorophenoxy)isobutyramidoacetic acid used as active ingredient in the above formulation there is used an equal quantity of N-phenoxyacetylglycine or N-(4-chlorophenoxyacetyl)glycine. There are thus likewise obtained tablets suitable for oral administration to man for therapeutic purposes.

Example 3.—To a cooled stirred mixture of 3 parts of glycine in a solution of 4.8 parts of sodium hydroxide in 30 parts of water is added 9.4 parts of 4-chlorophenoxyisobutyryl chloride in portions keeping the temperature below 10° C. The mixture is allowed to warm to 20° C. and is then filtered and the filtrate is acidified with hydrochloric acid. The mixture is filtered, and the solid residue is washed with petroleum ether (B.P. 60–80° C.) and is crystallised from benzene. There is thus obtained α-(4-chlorophenoxy)-isobutyramidoacetic acid, M.P. 74–75° C.

The above process is repeated using DL α-alanine instead of glycine as starting material and there is thus obtained, in a similar manner, 2-α-(4-chlorophenoxy)isobutyramidopropionic acid, M.P. 111–112° C. after crystallisation from water.

The above process is repeated using β-alanine instead of glycine as starting material and there is obtained, in a similar manner, 3-α-(4-chlorophenoxy)isobutyramidopropionic acid, M.P. 111° C. after crystallisation from aqueous methanol.

The above process is repeated using sarcosine instead of glycine as starting material and there is thus obtained, in a similar manner, α-(4-chlorophenoxy)-N-methylisobutyramidoacetic acid, M.P. 136–138° C. after crystallisation from benzene/petroleum ether (B.P. 40–60° C.).

Example 4.—A mixture of 5 parts of α-(4-chlorophenylthio)isobutyric acid and 2.5 parts of thionyl chloride is heated at 90° C. for 15 minutes. The excess thionyl chloride is then removed by distillation under reduced pressure and the residue is added to ammonium hydroxide (density=0.88) with cooling. The mixture is filtered, and the solid residue is crystallised from methanol. There is thus obtained α-(4-chlorophenylthio)isobutyramide, M.P. 106–107° C.

The above process is repeated using, in place of α-(4-chlorophenylthio)isobutyric acid, the approriate butyric acid derivative as starting material, and there are thus obtained: α-(4-methoxyhenoxy)isobutyramide, M.P. 89–90° C. (crystallised from cyclohexane), α-(4-benzylphenoxy)isobutyramide, M.P. 119–120° C. (crystallised from cyclohexane), α-(4-phenylphenoxy)isobutyramide, M.P. 179–180° C. (crystallised from methanol) and α-(4-chlorophenoxy)-n-butyramide, M.P. 108–110° C. (crystallised from aqueous methanol).

Example 5.—A mixture of 5 parts of α-(4-bromophenoxy)-isobutyric acid and 5 parts of thionyl chloride is heated under reflux for 15 minutes. The excess thionyl chloride is then removed by distillation under reduced pressure and the residue is added to an excess of 40% aqueous methylamine solution with cooling. The mixture is filtered and the solid residue is crystallised from cyclohexane. There is thus obtained α-(4-bromophenoxy)-N-methylisobutyramide, M.P. 81–82° C.

Example 6.—To a cooled stirred mixture of 2.9 parts of glycine in a solution of 4.8 parts of sodium hydroxide in 30 parts of water are added 8 parts of 4-tolyloxyisobutyryl chloride in portions, keeping the temperature below 10° C. After 30 minutes the mixture is allowed to warm to 20° C. and is then filtered and the filtrate is acidified with hydrochloric acid. The mixture is extracted with ether, the ether solution dried over sodium sulphate, and the solvent removed by distillation. The solid residue is crystallised from aqueous methanol and there is thus obtained α-(4-tolyloxy)isobutyramidoacetic acid M.P. 107° C.

The above process is repeated using, in place of 4-tolyloxyisobutyryl chloride, the appropriate isobutyryl chloride derivative as starting material, and there are thus obtained: α-(4-bromophenoxy)isobutyramidoacetic acid, M.P. 130–132° C. (crystallised from benzene), α-(1-naphthoxy)isobutyramidoacetic acid, M.P. 82–84° C. (crystallised from benzene), α-(4-chlorophenylthio)isobutyramidoacetic acid, M.P. 62–64° C. (crystallised from methanol with one molecule of methanol of crystallisation) and α-(4-chlorophenylsulphonyl)isobutyramidoacetic acid monohydrate, M.P. 105–106° C. after drying at 55° C. (crystallised from benzene).

Example 7.—To a cooled stirred solution of 9 parts of 50% aqueous allylamine are added gradually 7 parts of α-(4-chlorophenoxy)isobutyryl chloride. The mixture is extracted with ether, the ether extract is washed with dilute hydrochloric acid, then with water and dried over magnesium sulphate. The solvent is removed by distillation and the residue distilled under reduced pressure. There is thus obtained N-allyl-α-(4-chlorophenoxy)isobutyramide B.P. 131° C./0.5 mm., and M.P. 46–48° C.

The above process is repeated using, in place of 50% aqueous allylamine, the appropriate amine as starting material, and there are thus obtained: α-(4-chlorophenoxy)-N-(2-hydroxyethyl)isobutyramide, B.P. 124° C./0.6 mm., α-(4-chlorophenoxy)-N,N-dimethylisobutyramide, M.P. 44–45° C. and N-t-butyl-α-(4-chlorophenoxy)isobutyramide, M.P. 65–66° C. (crystallised from aqueous ethanol).

Example 8.—To a cooled stirred solution of 3.5 parts of p-phenetidine in 10 parts of pyridine are added 6.7 parts of α-(4-chlorophenoxy)isobutyryl chloride in portions keeping the temperature below 5° C. The mixture is allowed to warm to 20° C. and is then heated at 90° C. for 10 minutes. The mixture is cooled, poured into water, filtered and the solid residue crystallised from ethyl acetate/petroleum ether B.P. 60–80° C. There is thus obtained α-(4-chlorophenoxy)-N-(4-ethoxyphenyl)isobutyramide M.P. 122–123° C.

Example 9.—A mixture of 500 parts of α-4-chlorophenoxy)-isobutyramide, 25 parts of androsterone, 94 parts of maize starch, 45 parts of alginic acid and 3.5 parts of magnesium stearate is compressed into slugs which are then broken into granules. The granules are passed through an 8-mesh screen and 3.5 parts of magnesium stearate are then added. The mixture is compressed into tablets which are suitable for oral administration for therapeutic purposes.

Example 10.—200 parts of α-(4-chlorophenoxy)isobutyramide and 6 parts of androsterone are mixed together and filled into gelatin capsules which are then suitable for oral administration for therapeutic purposes.

Example 11.—To a mixture of 40 parts of α-(4-chlorophenoxy)isobutyramide and 34 parts of liquid paraffin are added 3 parts of gum acacia and 1.5 parts of gum tragacanth. To the thoroughly triturated mixture is added slowly with stirring a solution of 0.1 part of a cetyl alcohol polyoxyethylene condensate, 40 parts of cane sugar, 0.03 part of propyl p-hydroxybenzoate, 0.3 part of methyl p-hydroxybenzoate and 0.002 part of an edible dyestuff in 110 parts of water. After the incorporation of a suitable flavouring agent, the mixture is homogenised by passage through a conventional homogeniser and there is thus obtained an emulsion suitable for oral administration for therapeutic purposes.

What I claim is:

1. A butyric acid derivative having the structural formula:

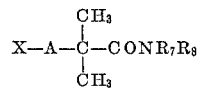

wherein X is a member selected from the group consisting of phenyl, napthyl, substituted phenyl, and substituted naphthyl, the substituent on each of said phenyl and naphthyl being a member selected from the group consisting of chlorine, bromine, lower alkyl, lower alkoxy, phenyl and phenyl-lower alkyl, wherein A is a member selected from the group consisting of oxygen, sulfur and sulphonyl; wherein $R_7$ is a member selected from the group consisting of hydrogen and alkyl having up to 6 carbon atoms, wherein $R_8$ is a carboxyalkyl wherein the alkyl moiety has up to 6 carbon atoms and the alkali metal and alkaline earth metal salts thereof.

2. The butyric acid derivative of claim 1 wherein X is a member selected from the group consisting of chlorophenyl, bromophenyl and methyl phenyl.

3. The butyric acid derivative of claim 1 wherein X is chlorophenyl or bromophenyl, A is oxygen, $R_7$ is a member selected from the group consisting of hydrogen and methyl, $R_8$ is a member selected from the group consisting of carboxymethyl, 1-carboxyethyl and 2-carboxyethyl.

4. A compound selected from the group consisting of α-(4-chlorophenoxy)isobutyramidoacetic acid, 2-[α-(4-chlorophenoxy)isobutyramido]-propionic acid, 3-[α-(4-chlorophenoxy)isobutyramido]-propionic acid, α-(4-chlorophenoxy)-N-methyl-isobutyramidoacetic acid, α-(4-tolyloxy)isobutyramidoacetic acid, α-(4-bromophenoxy)isobutyramidoacetic acid, α-(1-naphthoxy)isobutyramidoacetic acid, α-(4-chlorophenylthio)isobutyamidoacetic acid and α-(4-chlorophenylsulphonyl)isobutyramidoacetic acid.

References Cited
UNITED STATES PATENTS 2,823,123   2/1958   Knox et al. _____ 260—519

LORRAINE A. WEINBERGER, *Primary Examiner.*

L. A. THAXTON, *Assistant Examiner.*